(12) United States Patent
Storfer et al.

(10) Patent No.: US 11,940,797 B2
(45) Date of Patent: Mar. 26, 2024

(54) NAVIGATING SEMI-AUTONOMOUS MOBILE ROBOTS

(71) Applicant: Intel Corporation, Santa Clara, CA (US)

(72) Inventors: Lior Storfer, Haifa (IL); Tamara Gaidar, Haifa (IL); Ido Lapidot, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/867,168

(22) Filed: May 5, 2020

(65) Prior Publication Data
US 2020/0401144 A1    Dec. 24, 2020

Related U.S. Application Data

(63) Continuation of application No. 15/677,891, filed on Aug. 15, 2017, now Pat. No. 10,642,274, which is a
(Continued)

(51) Int. Cl.
*G05D 1/02*    (2020.01)
*G05D 1/00*    (2006.01)
(Continued)

(52) U.S. Cl.
CPC ......... *G05D 1/0212* (2013.01); *G05D 1/0214* (2013.01); *G05D 1/0274* (2013.01);
(Continued)

(58) Field of Classification Search
CPC .... G08G 1/207; G05D 1/0214; G05D 1/0212; G05D 1/0274; G05D 1/0276;
(Continued)

(56) References Cited

U.S. PATENT DOCUMENTS 6,539,284 B2    3/2003   Nourbakhsh et al.
6,604,005 B1 *  8/2003   Dorst ................. G06F 30/18
                                                 700/254
(Continued)

FOREIGN PATENT DOCUMENTS

CN    108290290    7/2018
JP    2003281653   10/2003
(Continued)

OTHER PUBLICATIONS

The State Intellectual Property Office of People's Republic of China, "The First Office Action," issued in connection with Chinese Patent Application No. 201680068368.9, dated Mar. 23, 2021, 27 pages. English translation included.
(Continued)

*Primary Examiner* — Russell Frejd
*Assistant Examiner* — Sara J Lewandroski
(74) *Attorney, Agent, or Firm* — HANLEY, FLIGHT & ZIMMERMAN, LLC

(57) ABSTRACT

Techniques for navigating semi-autonomous mobile robots are described. A semi-autonomous mobile robot moves within an environment to complete a task. A navigation server communicates with the robot and provides the robot information. The robot includes a navigation map of the environment, interaction information, and a security level. To complete the task, the robot transmits a route reservation request to the navigation server, the route reservation request including a priority for the task, a timeslot, and a route. The navigation server grants the route reservation if the task priority is higher than the task priorities of conflicting route reservation requests from other robots. As the robot moves within the environment, the robot detects an object and attempts to classify the detected object as belonging to an object category. The robot retrieves an interaction profile for
(Continued)

the object, and interacts with the object according to the retrieved interaction profile.

24 Claims, 9 Drawing Sheets

Related U.S. Application Data continuation of application No. 14/757,685, filed on Dec. 23, 2015, now Pat. No. 9,740,207.

(51) Int. Cl.
    *G08G 1/00*          (2006.01)
    *B25J 9/16*           (2006.01)
    *H04W 4/021*       (2018.01)

(52) U.S. Cl.
    CPC ......... *G05D 1/0276* (2013.01); *G05D 1/0297* (2013.01); *G08G 1/207* (2013.01); *B25J 9/1676* (2013.01); *G05D 2201/0211* (2013.01); *H04W 4/021* (2013.01)

(58) Field of Classification Search
    CPC ........... G05D 1/0297; G05D 2201/0211; B25J 9/1676; H04W 4/021
    See application file for complete search history.

(56) References Cited

U.S. PATENT DOCUMENTS

| | | | |
|---|---|---|---|
| 8,374,780 | B2 | 2/2013 | Mays et al. |
| 8,386,078 | B1 | 2/2013 | Hickman et al. |
| 8,577,498 | B2 | 11/2013 | Kawano et al. |
| 9,446,510 | B2 | 9/2016 | Vu et al. |
| 9,513,627 | B1 | 12/2016 | Elazary et al. |
| 9,724,824 | B1 | 8/2017 | Annan et al. |
| 9,740,207 | B2 | 8/2017 | Storfer et al. |
| 10,642,274 | B2 | 5/2020 | Storfer et al. |
| 2005/0038562 | A1 | 2/2005 | Bash et al. |
| 2008/0243305 | A1 | 10/2008 | Lee et al. |
| 2008/0249662 | A1* | 10/2008 | Nakamura ........... B62D 57/032 901/1 |
| 2008/0294287 | A1 | 11/2008 | Kawano et al. |
| 2009/0149991 | A1* | 6/2009 | Sumida .................. G06N 3/008 700/246 |
| 2010/0063652 | A1 | 3/2010 | Anderson |
| 2010/0245083 | A1* | 9/2010 | Lewis ..................... G08B 7/066 340/517 |
| 2011/0149079 | A1 | 6/2011 | Anderson |
| 2012/0116584 | A1 | 5/2012 | Kim et al. |
| 2012/0221174 | A1* | 8/2012 | Daly ..................... G05D 1/0289 701/2 |
| 2012/0313779 | A1 | 12/2012 | Papaefstathiou et al. |
| 2014/0222206 | A1* | 8/2014 | Mead ..................... B25J 9/1697 700/259 |
| 2014/0249676 | A1 | 9/2014 | Florencio et al. |
| 2014/0333412 | A1 | 11/2014 | Lewis et al. |
| 2014/0350725 | A1* | 11/2014 | LaFary ................. G05D 1/0274 901/50 |
| 2014/0365258 | A1 | 12/2014 | Vestal et al. |
| 2015/0088310 | A1* | 3/2015 | Pinter .................... B25J 9/1676 901/1 |
| 2015/0224640 | A1 | 8/2015 | Vu et al. |
| 2015/0241880 | A1 | 8/2015 | Kim et al. |
| 2015/0290808 | A1 | 10/2015 | Renkis |
| 2015/0342150 | A1* | 12/2015 | Womble ................ A01K 15/02 119/718 |
| 2016/0225264 | A1 | 8/2016 | Taveira |
| 2016/0259339 | A1* | 9/2016 | High ....................... H04L 67/12 |
| 2016/0259342 | A1* | 9/2016 | High .................. G06Q 30/0613 |
| 2016/0274586 | A1 | 9/2016 | Stubbs et al. |
| 2017/0185085 | A1 | 6/2017 | Storfer et al. |
| 2018/0231981 | A1 | 8/2018 | Storfer et al. |
| 2019/0073547 | A1 | 3/2019 | el Kaliouby et al. |
| 2020/0401144 | A1 | 12/2020 | Storfer et al. |

FOREIGN PATENT DOCUMENTS

| | | |
|---|---|---|
| JP | 2009001425 | 1/2009 |
| JP | 2009136967 | 6/2009 |
| JP | 2012232852 | 11/2012 |
| JP | 2019508665 | 3/2019 |
| WO | 2006104810 | 10/2006 |
| WO | 2013176762 | 11/2013 |
| WO | 2014138472 | 9/2014 |

OTHER PUBLICATIONS

Japanese Patent Office, "Office Action," issued in connection with Japanese Patent Application No. 2018-519954, dated Jan. 12, 2021, 12 pages. English version included.

United States Patent and Trademark Office, "Corrected Notice of Allowance," issued in connection with U.S. Appl. No. 14/757,685, dated Apr. 27, 2017, 2 pages.

United States Patent and Trademark Office, "Final Office Action," issued in connection with U.S. Appl. No. 14/757,685, dated Jan. 23, 2017, 18 pages.

United States Patent and Trademark Office, "Non-Final Office Action," issued in connection with U.S. Appl. No. 14/757,685, dated Jul. 15, 2016, 15 pages.

United States Patent and Trademark Office, "Notice of Allowance," issued in connection with U.S. Appl. No. 14/757,685, dated Apr. 12, 2017, 11 pages.

International Searching Authority, "International Search Report," issued in connection with International Patent Application No. PCT/US2016/063093, dated Mar. 13, 2017, 4 pages.

International Searching Authority, "Written Opinion," issued in connection with International Patent Application No. PCT/US2016/063093, dated Mar. 13, 2017, 11 pages.

International Searching Authority, "International Preliminary Report on Patentability," issued in connection with International Patent Application No. PCT/US2016/063093, dated Jul. 5, 2018, 13 pages.

European Patent Office, "Extended European Search Report," issued in connection with European Patent Application No. 168797025, dated Jun. 25, 2019, 9 pages.

Hassan, H., "A Real-Time Model of Flexible Tasks for Mobile Robotic Applications Based on a Behavioural Achitecture," Proceedings 11999 7th IEEE International Conference on Emerging Technologies and Factory Automation :Oct. 18-21, 1999, UPC, Barcelona, Catalania, Spain, IEEE Service Center, Piscataway, NJ, vol. 1, XP010365829, DOI: 10.1109 ETFA. 1999.815348, (Oct. 18, 1999), 137-144.

United States Patent and Trademark Office, "Non-Final Office Action," issued in connection with U.S. Appl. No. 15/677,891, dated Mar. 28, 2019, 17 pages.

United States Patent and Trademark Office, "Final Office Action," issued in connection with U.S. Appl. No. 15/677,891, dated Oct. 9, 2019, 24 pages.

United States Patent and Trademark Office, "Notice of Allowance and Fee(s) Due," issued in connection with U.S. Appl. No. 15/677,891, dated Dec. 27, 2019, 24 pages.

United States Patent and Trademark Office, "Corrected Notice of Allowability," issued in connection with U.S. Appl. No. 15/677,891, dated Feb. 12, 2020, 3 pages.

Japanese Patent Office, "Decision to Grant a Patent," received in corresponding Japanese Patent Application No. 2018-519954 dated Sep. 2, 2021, 5 pages.

Chinese Patent Office, "Office Action," received in corresponding Chinese Patent Application No. 201680068368.9 dated Nov. 15, 2021, 3 pages.

Chinese Patent Office, "Third Office Action," issued in connection with Application No. 201680068368.9, dated Apr. 21, 2022, 18 pages (including rough machine translation).

(56) References Cited

OTHER PUBLICATIONS

Chinese Patent Office, "Decision of Rejection," issued in connection with Application No. 201680068368.9, dated Oct. 26, 2022, 25 pages (including rough machine translation).

* cited by examiner

NAVIGATING SEMI-AUTONOMOUS MOBILE ROBOTS

RELATED APPLICATIONS

This patent arises from a continuation of U.S. patent application Ser. No. 15/677,891, filed Aug. 15, 2017, entitled "NAVIGATING SEMI-AUTONOMOUS MOBILE ROBOTS," which is a continuation of U.S. patent application Ser. No. 14/757,685, filed Dec. 23, 2015, entitled "NAVIGATING SEMI-AUTONOMOUS MOBILE ROBOTS." U.S. patent application Ser. No. 15/677,891 and U.S. patent application Ser. No. 14/757,685, are hereby incorporated by reference. Priority to U.S. patent application Ser. No. 15/677,891 and U.S. patent application Ser. No. 14/757,685 is hereby claimed.

TECHNICAL FIELD

The present disclosure relates generally to robotics, and specifically to navigating semi-autonomous mobile robots.

BACKGROUND

Semi-autonomous mobile robots are appearing in modern life with increasing frequency. As the use of these robots increases, these robots are more likely to encounter unexpected objects and situations.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments or examples discussed in the present document.

DETAILED DESCRIPTION

The present disclosure describes methods, systems, and computer program products that individually facilitate navigating semi-autonomous mobile robots. In this disclosure, the term "robot" refers to a mobile electro-mechanical machine. A "semi-autonomous" robot is a robot that is under partial, but not complete, control of an entity external to the robot.

A mobile robot has the capability to move around in its environment and is not fixed to one physical location. An example of a mobile robot that is in common use today is an automated guided vehicle or automatic guided vehicle (AGV). An AGV is a mobile robot that navigates by following markers or wires in or on the floor, by using computer vision, or by using sensors (e.g., lasers). Mobile robots may be found in industrial, military, and security environments, among others. They also appear as consumer products, for entertainment or to perform certain tasks like vacuum cleaning.

Mobile robots are usually used in tightly controlled environments, such as on assembly lines, because they have difficulty responding to unexpected interferences. Because of this, most humans rarely encounter robots outside of industrial, military, or security environments. However, domestic robots, such as those used for cleaning and maintenance, are increasingly common in and around homes in developed countries.

Commercial and industrial robots are now in widespread use performing jobs more cheaply and/or with greater accuracy and reliability than humans. Mobile robots are also employed for jobs which are too dirty, dangerous, or dull to be suitable for humans. Mobile robots are widely used in manufacturing, assembly and packing, transport, earth and space exploration, surgery, weaponry, laboratory research, and mass production of consumer and industrial goods.

As robots interact with humans and other robots with increasing frequency, unique problems may arise. For example, (1) differentiating between humans and non-humans, (2) classifying objects into different categories, and (3) prioritization of routes.

Figure 1:
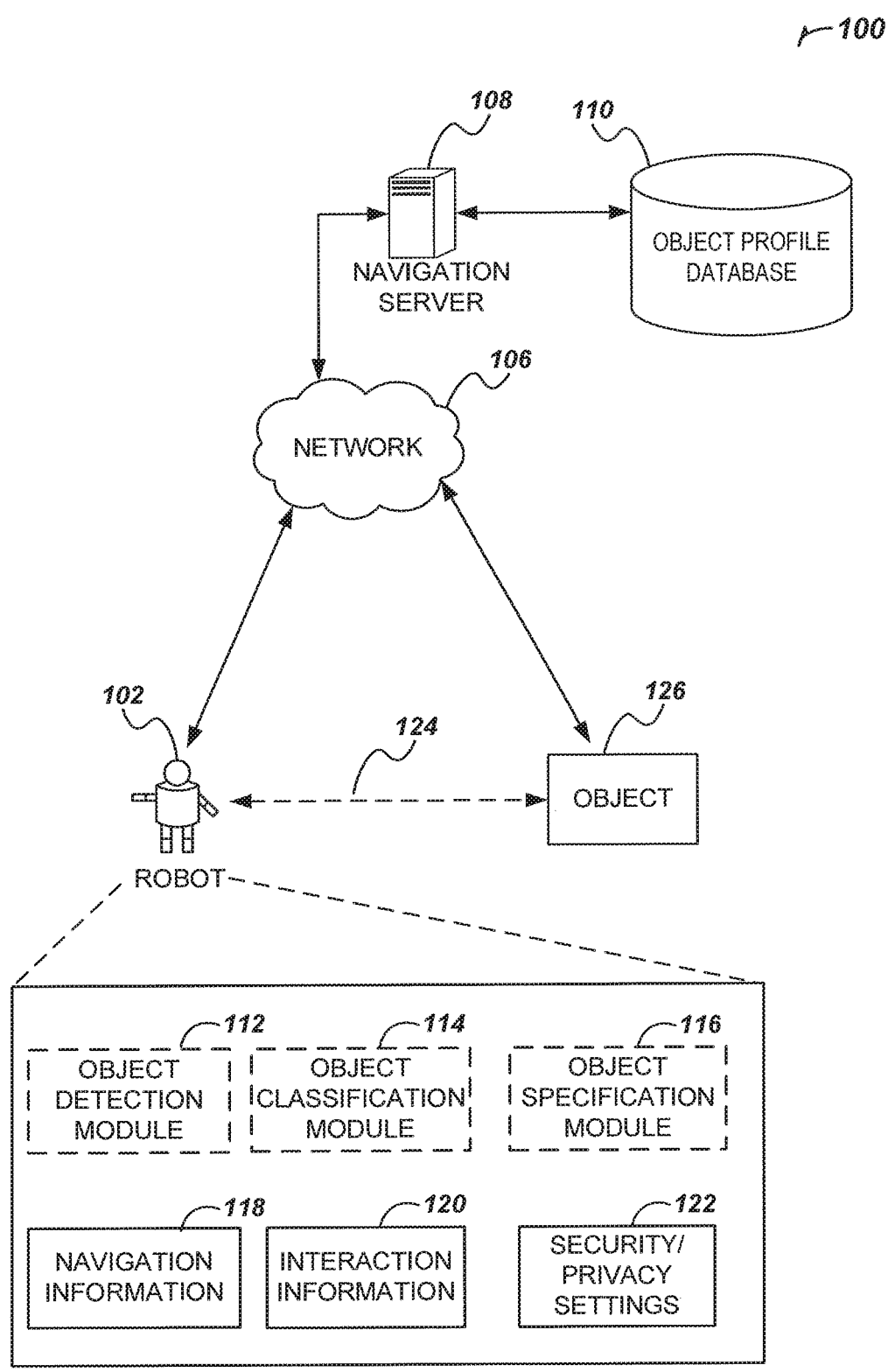
FIG. 1 illustrates an example of a system for navigating semi-autonomous mobile robots, according to an embodiment.

FIG. 1 illustrates an example of a system 100 for navigating semi-autonomous mobile robots, according to an embodiment. The system 100 includes one or more robots 102, a network 106, a navigation server 108, and an object profile database 110.

An environment may be as small as a room within a building or may be as large as an industrial complex. A robot 102 moves within the environment based on factors such as the robot's assigned task(s), objects that may exist within the environment, physical condition(s) of the environment, etc.

The navigation server 108 and the object profile 110 may be located entirely within a closed environment (e.g., a floor of a building, a building, a complex of buildings, etc.), may be located partially within the closed environment and partially outside of the closed environment, or may be located entirely outside of the closed environment.

A robot 102 communicates with navigation server 108 via network 106. The network 106 may be a wireless local area network (\WAN), a wide-area network (WAN), or may be the Internet. As a robot 102 operates within the environment, the robot 102 transmits various information to the navigation server 108 and receives various information from the navigation server 108. For example, a robot 102 may collect various information from its various sensors (e.g., speedometer, accelerometer, camera, motion detector, compass, etc.) and transmit this information to the navigation server 108. The navigation server 108 may transmit various information to the robot 102, such as commands, information updates, answers to inquiries submitted by the robot 102, etc.

As a robot 102 operates within the environment, the robot 102 may encounter various objects. A robot 102 may utilize object detection to attempt to detect whether an object exists within a portion of the environment. In an embodiment, the object detection functionality exists entirely within object detection module 112 of robot 102; in another embodiment, the object detection functionality exists partially within object detection module 112 of robot 102 and partially within an external system (e.g., navigation server 108); in yet another embodiment, the object detection functionality exists entirely within an external system. In embodiments where part or all of the object detection functionality exists within an external system, the robot 102 transmits information to and receives object detection information from the external system via network 106. The object detection functionality may use one or more sensors of various types, such as optical sensors, acoustic sensors, infrared sensors, etc. The sensor(s) may be part of robot 102, may be external to robot 102, or some combination thereof.

When robot 102 detects an object within an environment, the robot 102 may utilize object classification to attempt to classify the detected object as belonging to one or more categories. Categories recognized by the system may be as broad as "living organisms" and "inanimate objects," or may be more specific. For example, common categories may include: living creatures, humans, animals, plants, etc.), static objects (e.g., immovable objects, such as a wall of a building), static-dynamic objects (e.g., heavy furniture, such as a couch), potentially dynamic objects (e.g., light moveable furniture, such as an office chair), and other robots.

In an embodiment, the object classification functionality exists entirely within object classification module 114 of robot 102; in another embodiment, the object classification functionality exists partially within object classification module 114 of robot 102 and partially within an external system (e.g., navigation server 108); in yet another embodiment, the object classification functionality exists entirely within an external system. In embodiments where part or all of the object classification functionality exists within an external system, the robot 102 transmits information to and receives object classification information from the external system via network 106. The object classification module 114 may be operable to implement one or more object classification algorithms or "classifiers," which may use various methods including, but not limited to, machine learning techniques (e.g., linear classifiers, support vector machines, decision trees, neural networks, etc.)

When robot 102 has classified an object within environment as belonging to one or more categories, the robot 102 may utilize object specification to attempt to specify the object as a particular object within the category/categories. For example, if object classification categorized the object as a human, object specification may identify the human as a particular person.

In an embodiment, the object specification functionality exists entirely within object specification module 116 of robot 102; in another embodiment, the object specification functionality exists partially within object specification module 116 of robot 102 and partially within an external system (e.g., navigation server 108); in yet another embodiment, the object specification functionality exists entirely within an external system. In embodiments where part or all of the object specification functionality exists within an external system, the robot 102 transmits information to and receives object specification information from the external system via network 106. The object specification module 116 may be operable to implement one or more object classification algorithms or "classifiers," which may use various methods including, but not limited to, machine learning techniques (e.g., linear classifiers, support vector machines, decision trees, neural networks, etc.)

In an embodiment, robot 102 includes navigation information 118, which may include one or more navigation maps of: the environment (or portions of the environment), one or more environments (or portions of the environments) adjacent to environment, or some combination thereof. Navigation information 118 may also include one or more routes of robot 102 and/or of other robots within the environment. The navigation information 118 may be provided to robot 102 by navigation server 108. In an embodiment, navigation server 108 may preplan one or more routes of one or more robots by using timetables and/or synchronized timers.

Navigation information 118 may also include one or more of the following information: (1) information about one or more robots that are in environment, were previously in environment, or may be present in environment in the future; (2) information regarding past, present, or future routes of one or more robots within environment; and (3) information regarding past, present, or future objects within environment.

In an embodiment, robot 102 includes interaction information 120, which may include models of behavioral interaction (e.g., profiles) based on object category and/or identity. Interaction information 120 may include profiles for various categories of objects or for specific objects; when robot 102 encounters an object 126, the robot 102 may look up the profile for the object's category (or for the specific object) from interaction information 120 and proceed to interact with the object according to the object's profile. In an embodiment, navigation server 108 includes (or communicates with) object profile database 110, which stores object category profiles and/or profiles for individual objects. If a robot 102 encounters an object 126 and interaction information 120 does not have a profile stored for the object (or for a category, to which the object belongs), robot 102 may request the missing profile from navigation server 108, which may retrieve the profile from object profile database 110 and transmit the profile to robot 102. In an embodiment, a robot 102 with a sufficient security level may be able to update a profile in the object profile database 110. In an embodiment, a profile for a person may include one or more of the following: the person's name, an image of the person's face, an full image of the person, the person's physical characteristics (e.g., height, weight, voice imprint, etc.); a robot 102 may use one or more of these to identify a human the robot 102 encounters within the environment.

In an embodiment, interaction information 120 includes priority information for robot 102. The priority information of two or more robots may be used by navigation server 108 to determine a prioritization of conflicting travel routes of the two or more robots. A prioritization for a robot 102 may include one or more timeslots and a route reservation. If a route (or part of a route) includes multiple lanes, a route reservation may include one or more reservations for one or more lanes. In an embodiment, a robot 102 moving along its route may contact other robots 102 along the route and inform the other robots 102 of its priority; the robots 102 with lower-priority along the route will adjust their routes accordingly so that they do not obstruct the route of the higher-priority robot 102.

In an embodiment, robot 102 includes security/privacy settings 122. Security settings may involve what information and/or physical areas the robot may access, whereas privacy settings may involve what information the robot may share and with whom the robot may share the information. Security settings may include a residency status (e.g., whether the robot 102 is a "resident" or a "guest" within environment), a security level for the robot 102 (e.g., an enumerated level, such as "Secret" or "Top Secret," or an ordinal number, such as "75"), etc. Privacy settings may include a privacy level (e.g., an enumerated level, such as "private," "public," or "mixed," or an ordinal number, such as "10"), a data structure associating information with those entities with whom the information may be shared, etc. In an embodiment, the navigation server 108 may temporarily elevate the security level of a robot 102 to allow the robot 102 to perform an emergency task (e.g., rescuing a human trapped in a portion of the environment that the robot 102 would not normally be allowed to access). After the emergency has ceased, the navigation server 108 may command/force the robot 102 to delete all information obtained by the robot 102 that is above the robot's 102 normal security level, and revert the robot's 102 security level to its pre-emergency level. To facilitate this functionality, in an embodiment, navigation server 108 may require each robot 102 who is to operate in the environment to have a dedicated memory that may be controlled by navigation server 108.

In an embodiment, depending upon the interaction information 120 and/or security/privacy settings 122 of a robot 102, robot 102 may communicate 124 with another object 126 within the environment. Whether two robots 102 may communicate with each other depends upon their respective interaction information 120, security/privacy settings 122, etc.

In an embodiment, the navigation server 108 is able to identify an abnormality in a robot's 102 route or interaction information 120. For example, the navigation server 108 may compare the robot's 102 reserved time slot(s) and reserved route to the time and route actually traversed by the robot 102. If the navigation server 108 identifies an abnormality, the navigation server 108 may mitigate the abnormality in one or more ways. For example, the navigation server 108 may dispatch an "officer" robot to investigate an "abnormal" robot, the navigation server 108 may alert other robots within the environment of the "abnormal" robot's status, the navigation server 108 may restrict the security level of the "abnormal" robot, the navigation server 108 may force the "abnormal" robot to reboot, etc.

Figure 2:
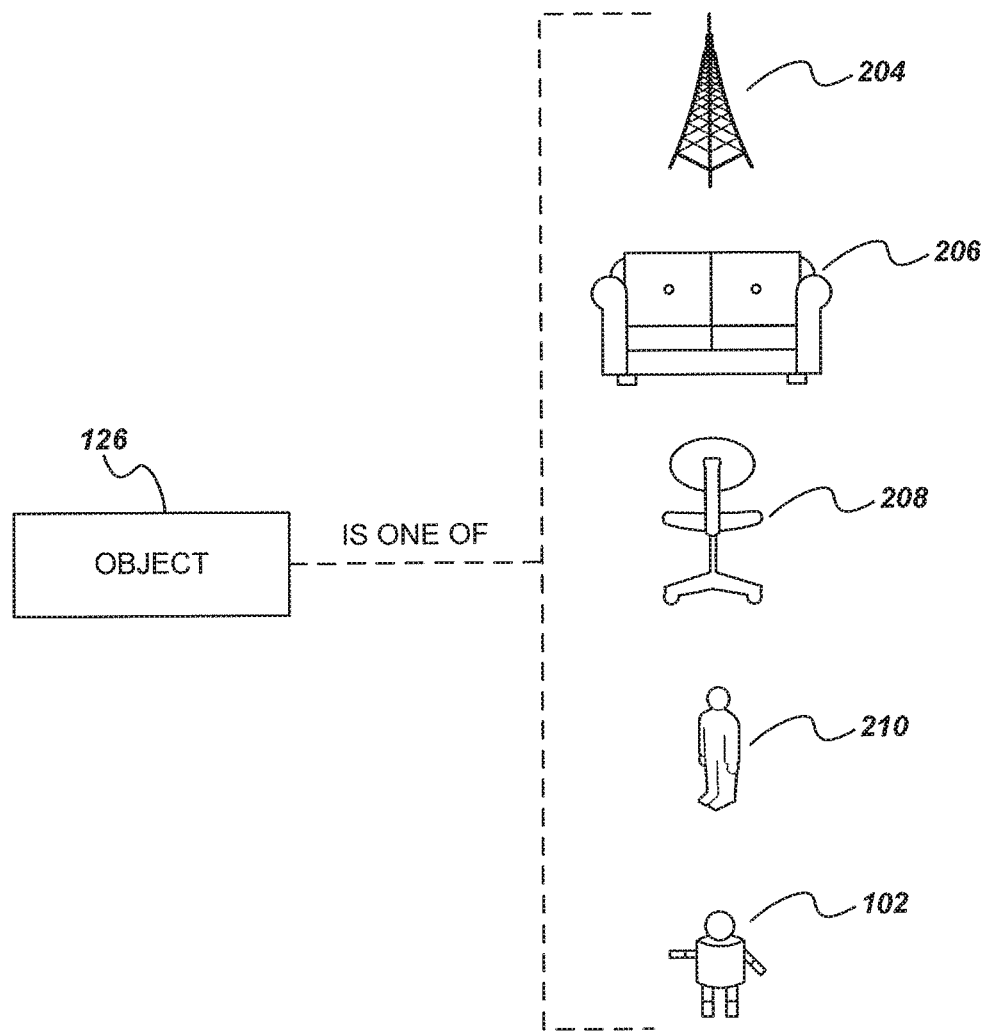
FIG. 2 illustrates an example of classifying an object encountered by a semi-autonomous mobile robot within an environment, according to an embodiment.
Figure 3:
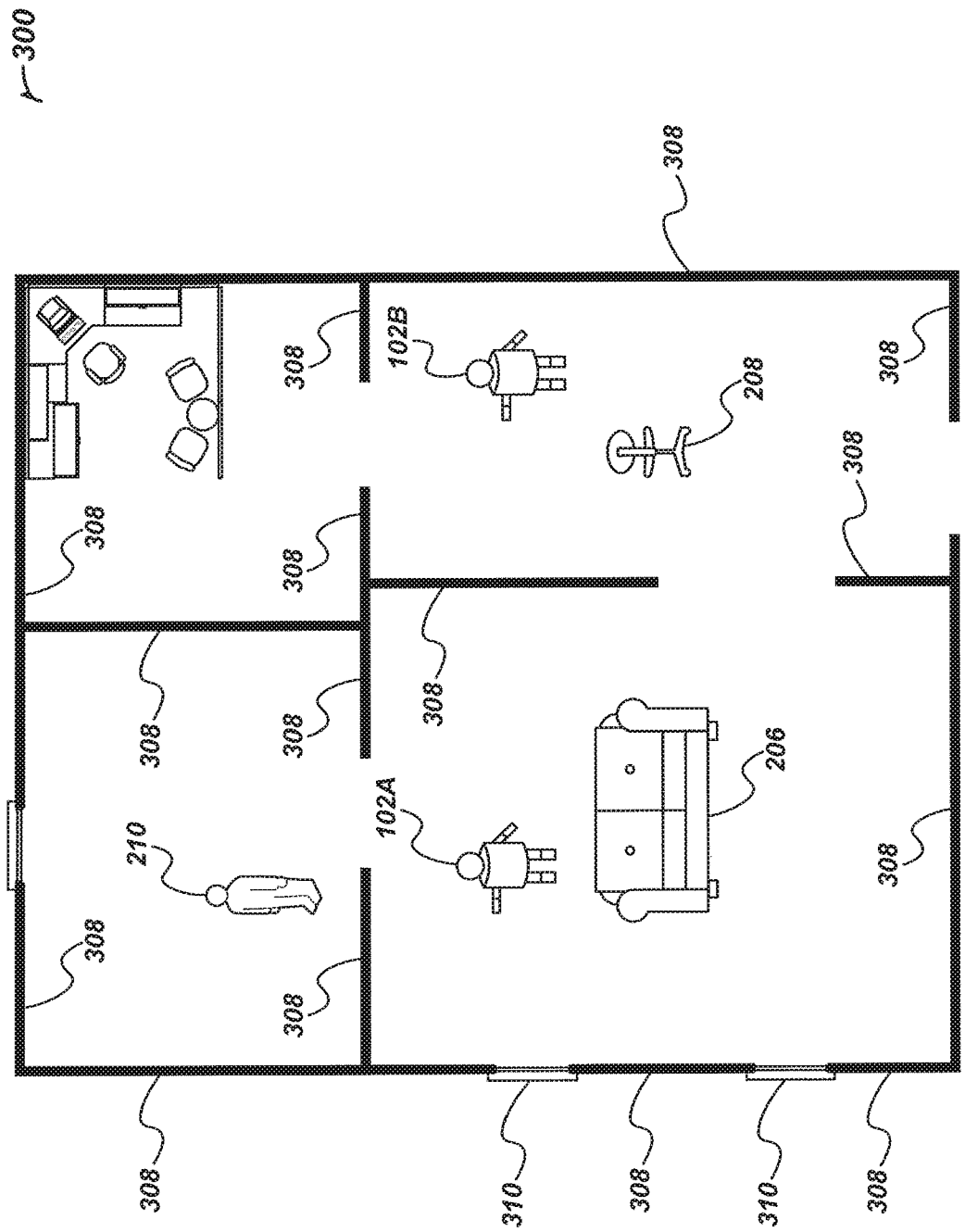
FIG. 3 illustrates an example of an environment including semi-autonomous mobile robots, according to an embodiment.

FIG. 2 illustrates an example of classifying an object 126 encountered by a semi-autonomous mobile robot 102 within an environment, according to an embodiment. When a robot 102 encounters an object 126 within the environment, the robot 102 may attempt to classify the object 126 as belonging to one or more categories. Common categories may include: "living creatures" (e.g., human 210), "static objects" (e.g., immovable objects, such as a radio tower 204), "static-dynamic objects" (e.g., heavy furniture, such as a couch 206), "potentially dynamic objects" (e.g., light moveable furniture, such as an office chair 208), and other robots 102, FIG. 3 illustrates an example of an environment 300 including semi-autonomous mobile robots 102A, 102B, according to an embodiment. Although environment 300 is illustrated as multiple rooms within an office building, in other embodiments, environment 300 may be a factory, a warehouse, a hospital, a prison, etc.

As each robot 102A, 102B moves within the environment 300, it encounters various objects 126 and attempts to classify those objects 126 in to one or more categories. For example, wall portions 308 are classified as "static objects," couch 206 is classified as a "static-dynamic object," office chair 208 is classified as a "potentially dynamic object," human 210 is classified as a "living creature," and the other robot 102B, 102A is classified as a robot.

In an embodiment, a robot 102A, 102B may interact differently with objects belonging to different categories. For example, if a robot 102A, 102B moves according to its route and encounters an obstruction, the robot 102A, 102B may interact with the obstruction depending on the category of the obstruction: if the obstruction is a wall portion 308 or a couch 206, the robot 102A, 102B will maneuver around the obstruction; if the obstruction is an office chair 208 on casters and without an occupant, the robot 102A, 102B may move the office chair 208 rather than maneuver around the office chair 208.

Figure 4:
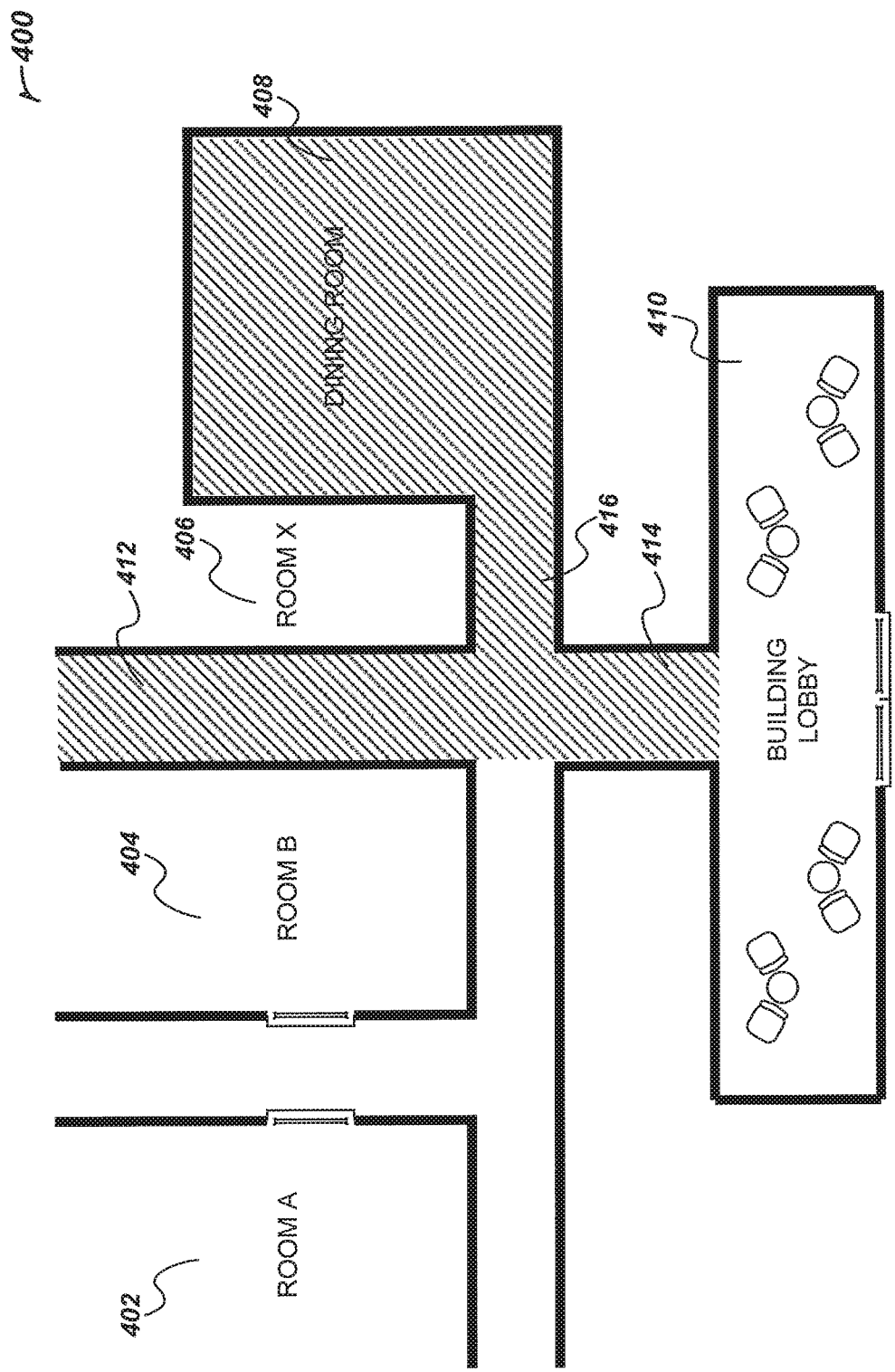
FIG. 4 illustrates an example of a portion of a navigation map, according to an embodiment.

FIG. 4 illustrates an example of a portion of a navigation map 400, according to an embodiment. The navigation map 400 includes Room A 402, Room B 404, Room X 406, Dining Room 408, and Building Lobby 410. As illustrated in FIG. 4, the Dining Room 408, as well as corridors 412, 414, and 416 are marked, signifying that these areas are high-traffic (e.g., crowded) areas for humans. The navigation map 400 may include additional information, such as scheduling information regarding one or more areas of the navigation map 400. For example, the marked areas illustrated in FIG. 4 may be listed as having heavy traffic on Mondays through Fridays between 11:00 A.M. and 2:00 P.M. Robots 102 may attempt to avoid areas that are marked as high-traffic areas unless no other option exists for completion of the robot's 102 task(s).

In an embodiment, a navigation map 400 may include one or more "layers" of information, each layer having one or more privacy configurations within security/privacy settings 122. For example, a layer of information with a "public" privacy configuration allows all information within the layer to be shared with the navigation server 108 and/or other robots, a layer of information with a "private" privacy configuration denies any information within the layer to be shared with the navigation server 108 and/or other robots, etc. In an embodiment, a layer of information may have a "mixed" privacy configuration that is in between "public" and "private." For example, a "mixed" privacy configuration may allow a malfunctioning robot to alert the navigation server 108 and/or other robots of its malfunction, but not allow any other information to be transmitted.

Figure 5:
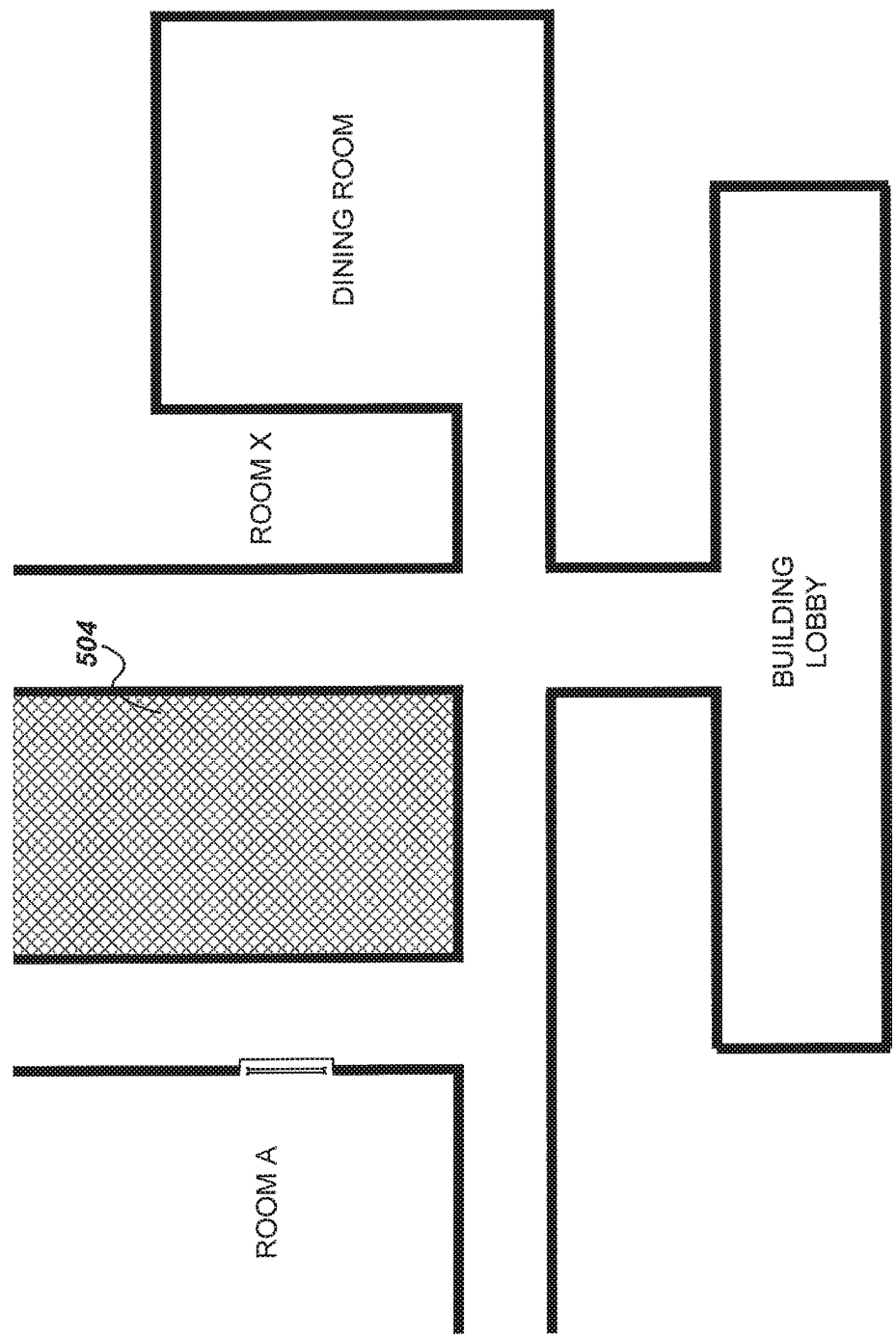
FIG. 5 illustrates an example of a portion of a redacted navigation map, according to an embodiment.

FIG. 5 illustrates an example of a portion of a redacted navigation map 500, according to an embodiment. Depending on a robot's 102 security/privacy settings 122, the navigation server 108 may provide a redacted version of navigation map 400. For example, the security/privacy settings 122 of a robot 102 do not allow the robot 102 to access Room B 404; instead of providing this robot 102 the entire navigation map 400, navigation server 108 provides this robot 102 a redacted navigation map 500, which does not include information regarding Room B 404. In an embodiment, a redacted navigation map 500 may have the redacted portion(s) of the map marked, such as redacted portion 504.

Figure 6:
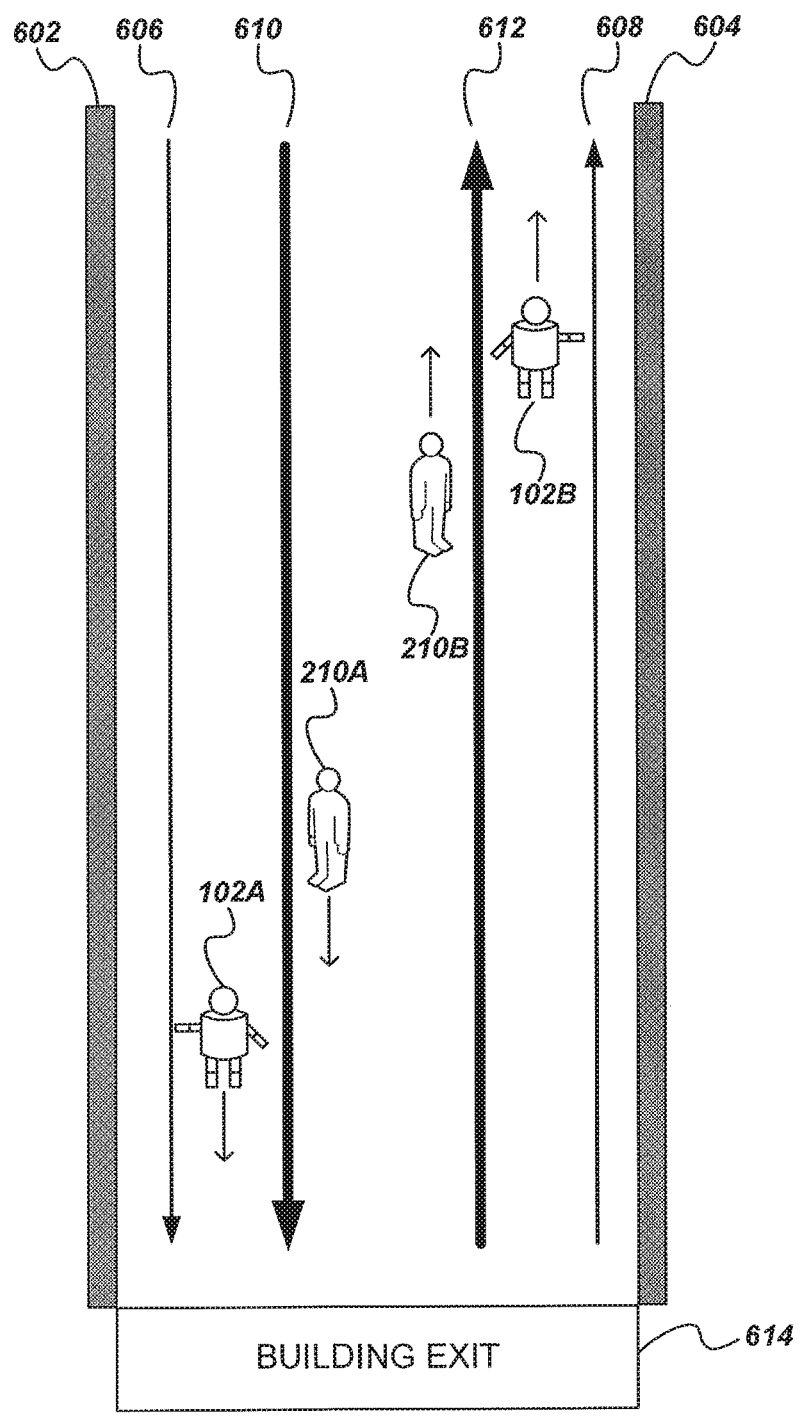
FIG. 6 illustrates a normal navigation lane configuration of virtual navigation lanes of an example building corridor during normal operating conditions, according to an embodiment.

FIG. 6 illustrates a normal navigation lane configuration 600 of virtual navigation lanes of an example building corridor during normal operating conditions, according to an embodiment. The example building corridor includes external walls 602, 604, and is connected to building exit 614; however, corridors other than those that are connected to building exits may also have similarly configured virtual navigation lanes.

A building corridor may have zero or more virtual lanes for humans and one or more virtual lanes for robots. The human and/or robotic lanes may be "virtual" in the sense that the floor and/or ceiling of the corridor may not be visually marked with lane delineations. Example building corridor is illustrated as having two robotic lanes 606, 608, with robotic lane 606 directed towards building exit 614 and robotic lane 608 directed away from building exit 614. Example building corridor is illustrated as having two human lanes 610, 612, with human lane 610 directed towards building exit 614 and human lane 612 directed away from building exit 614.

During normal operating conditions of the building, robots use robotic lane 606 to traverse the corridor towards building exit 614 and use robotic lane 608 to traverse the corridor away from building exit 614; similarly, during normal operating conditions of the building, and humans use human lane 610 to traverse the corridor towards building exit 614 and use human lane 612 to traverse the corridor away from building exit 614. In an embodiment, having separate lanes for humans and for robots reduces collisions between humans and robots. In an embodiment, having two or more opposite direction lanes for humans reduces collisions between humans; similarly for robots.

Figure 7:
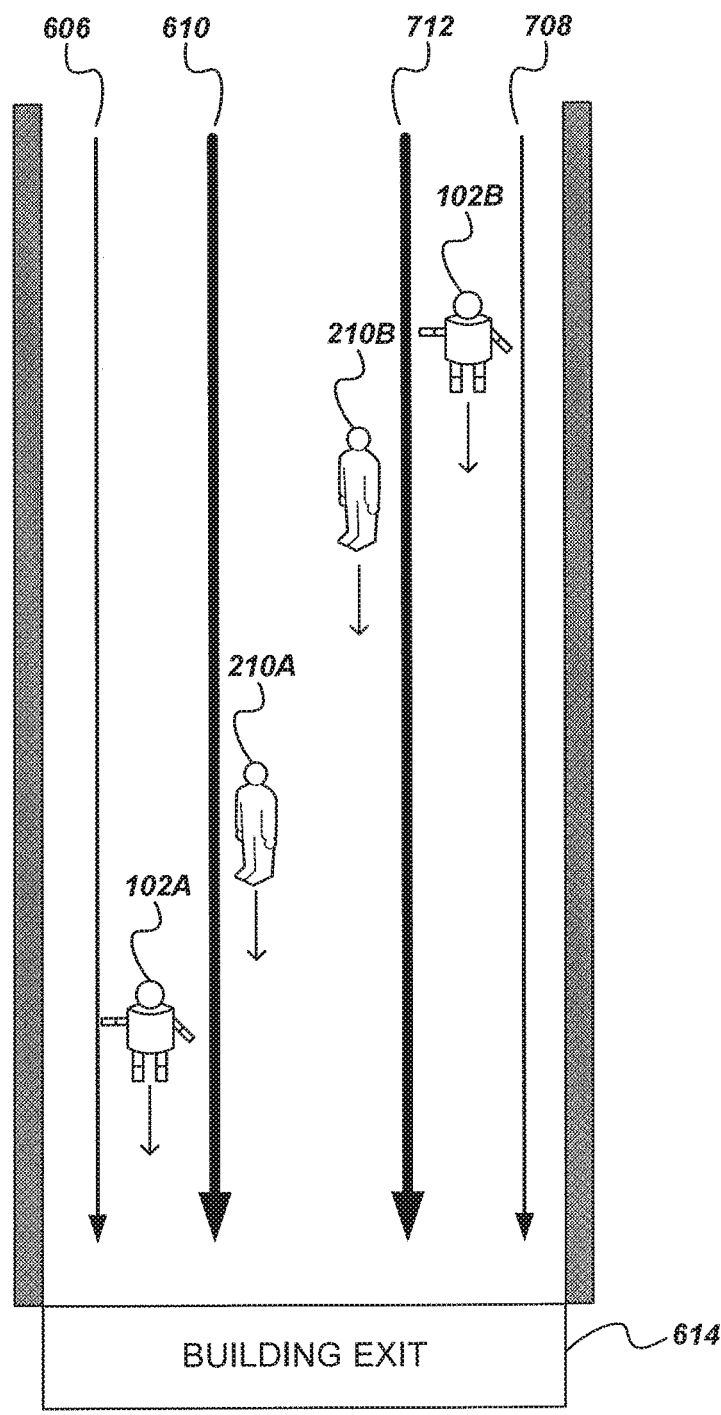
FIG. 7 illustrates an emergency navigation lane configuration of virtual navigation lanes of an example building corridor during emergency operating conditions, according to an embodiment.

FIG. 7 illustrates an emergency navigation lane configuration 700 of virtual navigation lanes of an example building corridor during emergency operating conditions, according to an embodiment. In the event of an emergency requiring occupants of the building to exit the building, navigation server 108 reconfigures the navigation maps of the robots 102 within the building to use emergency navigation lane configuration 700 instead of normal navigation lane configuration 600. As illustrated, emergency navigation lane configuration 700 includes unchanged lanes 606, 610 from normal navigation lane configuration 600; however, the direction of robotic lane 608 is reversed to form robotic lane 706, and the direction of human lane 612 is reversed to form human lane 712. Thus, emergency navigation lane configuration 700 has all virtual navigation lanes directed towards building exit 614.

Figure 8:
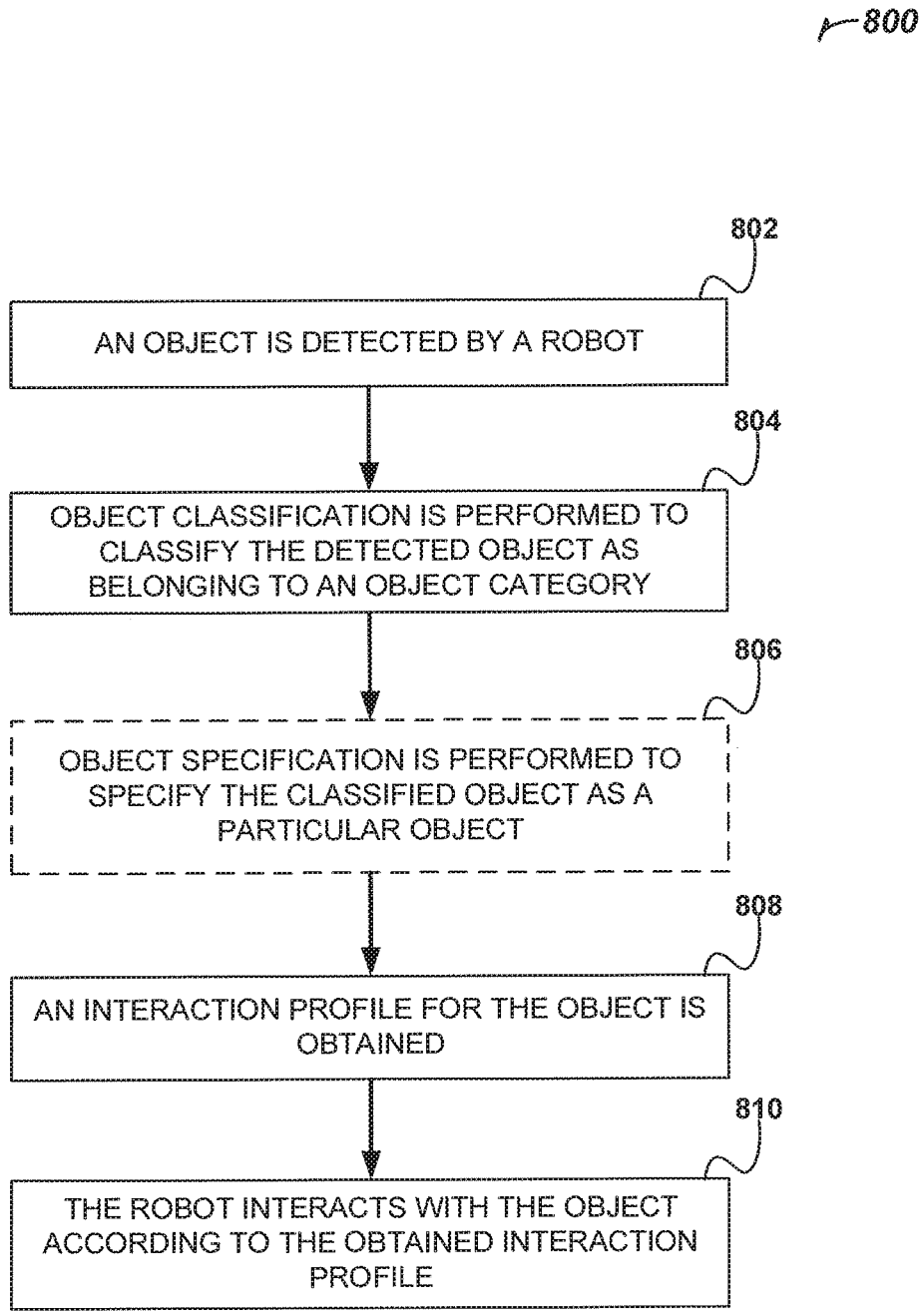
FIG. 8 is a flowchart illustrating operations performed during operation of a semi-autonomous mobile robot within an environment, according to an embodiment.

FIG. 8 is a flowchart illustrating operations 800 performed during operation of a semi-autonomous mobile robot within an environment, according to an embodiment.

A semi-autonomous mobile robot detects an object within the environment (operation 802). The object detection functionality may use one or more sensors of various types, such as optical sensors, acoustic sensors, infrared sensors, etc. The sensor(s) may be part of robot 102, may be external to robot 102, or some combination thereof.

Object classification is performed to classify the detected object as belonging to an object category (operation 804). The object classification functionality may be implemented as one or more object classification algorithms or "classifiers," which may use various methods including, but not limited to, machine learning techniques (e.g., linear classifiers, support vector machines, decision trees, neural networks, etc.)

Optionally, object specification is performed to specify the classified object as a particular object (operation 806).

An interaction profile for the object is obtained (operation 808).

The semi-autonomous mobile robot interacts with the object according to the obtained interaction profile (operation 810).

Figure 9:
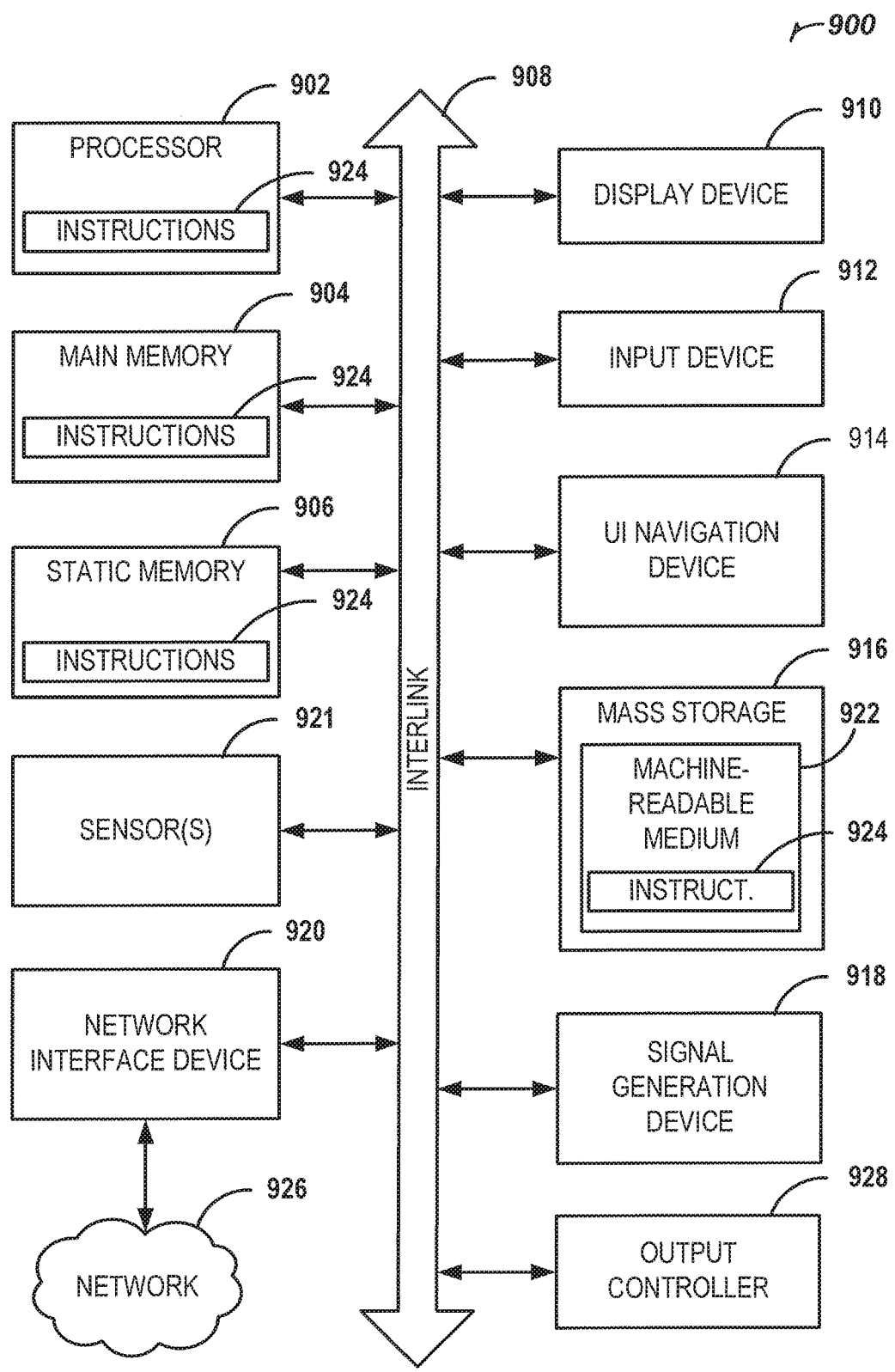
FIG. 9 is a block diagram illustrating an example of a machine, upon which any one or more embodiments may be implemented.

FIG. 9 is a block diagram illustrating an example of a machine 900, upon which any one or more embodiments may be implemented. In alternative embodiments, the machine 900 may operate as a standalone device or may be connected (e.g., networked) to other machines. In a networked deployment, the machine 900 may operate in the capacity of a server machine, a client machine, or both in a client-server network environment. In an example, the machine 900 may act as a peer machine in a peer-to-peer (P2P) (or other distributed) network environment. The machine 900 may implement or include any portion of the systems, devices, or methods illustrated in FIGS. 1-8, and may be a sensor, a robot, a server, or any machine capable of executing instructions (sequential or otherwise) that specify actions to be taken by that machine. Further, although only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations, etc.

Examples, as described herein, may include, or may operate by, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.)

The storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine-readable media.

Although the machine-readable medium 922 is illustrated as a single medium, the term "machine-readable medium" may include a single medium or multiple media (e.g., a centralized or distributed database, and/or associated caches and servers) configured to store the one or more instructions 924.

The term "machine-readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). The term "transmission medium" shall be taken to include any intangible medium that is capable of storing, encoding or carrying instructions for execution by the machine 900, and includes digital or analog communications signals or other intangible medium to facilitate communication of such software.

Additional Notes & Example Embodiments

Each of these non-limiting examples can stand on its own, or can be combined in various permutations or combinations with one or more of the other examples.

Example 1 is a system for navigating semi-autonomous mobile robots, the system comprising: a navigation server to communicate with a semi-autonomous mobile robot via a network, the robot to move within an environment; wherein the semi-autonomous mobile robot comprises: navigation information, including a map of the environment; interaction information, including: a model of behavioral interaction between the robot and an object within the environment, the model based on an object profile corresponding to the object; and a priority of a task the robot is to complete; and security settings, including a security level of the robot.

In Example 2, the subject matter of Example 1 optionally includes, wherein the navigation server is to: retrieve the object profile from an object profile database; and transmit the object profile to the semi-autonomous mobile robot.

In Example 3, the subject matter of any one or more of Examples 1-2 optionally include, wherein the semi-autonomous mobile robot further comprises: an object detection module to detect an object within the environment; an object classification module to classify a detected object as a member of an object category from a plurality of object categories; and an object specification module to specify a classified object as a particular object within the object category.

In Example 4, the subject matter of Example 3 optionally includes, wherein the object profile corresponds to the object category.

In Example 5, the subject matter of any one or more of Examples 3-4 optionally include, wherein the object profile corresponds to the particular object within the object category.

In Example 6, the subject matter of any one or more of Examples 3-5 optionally include, wherein the plurality of object categories comprises: living creatures; static objects; static-dynamic objects; potentially dynamic objects; and robots.

In Example 7, the subject matter of any one or more of Examples 1-6 optionally include, wherein the semi-autonomous mobile robot is to request a route reservation from the navigation server, the route reservation request comprising: the priority of the task the robot is to complete; a slot of time; and a route within the environment during the slot of time.

In Example 8, the subject matter of Example 7 optionally includes, wherein the navigation server is to grant the route reservation request based at least partially on the priority of the task the robot is to complete.

In Example 9, the subject matter of any one or more of Examples 1-8 optionally include, wherein the security level is an ordinal number.

In Example 10, the subject matter of any one or more of Examples 1-9 optionally include, wherein the map of the environment is redacted based at least partially on the security level of the robot.

In Example 11, the subject matter of any one or more of Examples 1-10 optionally include, wherein the navigation information further comprises: information regarding a plurality of objects within the environment.

In Example 12, the subject matter of any one or more of Examples 1-11 optionally include, wherein the environment is at least one of: a factory; a hospital; an office building; and a prison.

In Example 13, the subject matter of any one or more of Examples 1-12 optionally include, wherein the navigation server is to: receive information collected by the semi-autonomous mobile robot; and transmit information to the semi-autonomous mobile robot.

In Example 14, the subject matter of any one or more of Examples 1-13 optionally include, wherein the semi-autonomous robot is one of a plurality of semi-autonomous robots to operate within the environment.

In Example 15, the subject matter of any one or more of Examples 1-14 optionally include, wherein the interaction information includes a privacy setting specifying information the semi-autonomous mobile robot may share with the object.

Example 16 is a method for navigating semi-autonomous mobile robots, the method comprising: communicating, by a navigation server with a semi-autonomous mobile robot via a network, the robot to move within an environment; wherein the semi-autonomous mobile robot comprises: navigation information, including a map of the environment; interaction information, including: a model of behavioral interaction between the robot and an object within the environment, the model based on an object profile corresponding to the object; and a priority of a task the robot is to complete; and security settings, including a security level of the robot.

In Example 17, the subject matter of Example 16 optionally includes: retrieving, by the navigation server, the object profile from an object profile database; and transmitting, from the navigation server, the object profile to the semi-autonomous mobile robot.

In Example 18, the subject matter of any one or more of Examples 16-17 optionally include, wherein the semi-autonomous mobile robot further comprises: an object detection module to detect an object within the environment; an object classification module to classify a detected object as a member of an object category from a plurality of object categories; and an object specification module to specify a classified object as a particular object within the object category.

In Example 19, the subject matter of Example 18 optionally includes, wherein the object profile corresponds to the object category.

In Example 20, the subject matter of any one or more of Examples 18-19 optionally include, wherein the object profile corresponds to the particular object within the object category.

In Example 21, the subject matter of any one or more of Examples 18-20 optionally include, wherein the plurality of object categories comprises: living creatures; static objects; static-dynamic objects; potentially dynamic objects; and robots.

In Example 22, the subject matter of any one or more of Examples 16-21 optionally include, wherein the semi-autonomous mobile robot is to request a route reservation from the navigation server, the route reservation request comprising: the priority of the task the robot is to complete; a slot of time; and a route within the environment during the slot of time.

In Example 23, the subject matter of Example 22 optionally includes: granting, by the navigation server, the route reservation request based at least partially on the priority of the task the robot is to complete.

In Example 24, the subject matter of any one or more of Examples 16-23 optionally include, wherein the security level is an ordinal number.

In Example 25, the subject matter of any one or more of Examples 16-24 optionally include, wherein the map of the environment is redacted based at least partially on the security level of the robot.

In Example 26, the subject matter of any one or more of Examples 16-25 optionally include, wherein the navigation information further comprises: information regarding a plurality of objects within the environment.

In Example 27, the subject matter of any one or more of Examples 16-26 optionally include, wherein the environment is at least one of: a factory; a hospital; an office building; and a prison.

In Example 28, the subject matter of any one or more of Examples 16-27 optionally include, further comprising: receiving, by the navigation server, information collected by the semi-autonomous mobile robot; and transmitting, from the navigation server, information to the semi-autonomous mobile robot.

In Example 29, the subject matter of any one or more of Examples 16-28 optionally include, wherein the semi-autonomous robot is one of a plurality of semi-autonomous robots operating within the environment.

In Example 30, the subject matter of any one or more of Examples 16-29 optionally include, wherein the interaction information includes a privacy setting specifying information the semi-autonomous mobile robot may share with the object.

Example 31 is at least one machine-readable medium including instructions which, when executed by a machine, cause the machine to perform operations of any of the methods of Examples 16-29.

Example 32 is an apparatus comprising means for performing any of the methods of Examples 16-29.

Example 33 is an apparatus for navigating semi-autonomous mobile robots, the apparatus comprising: means for communicating, by a navigation server with a semi-autonomous mobile robot via a network, the robot to move within an environment; wherein the semi-autonomous mobile robot comprises: navigation information, including a map of the environment; interaction information, including: a model of behavioral interaction between the robot and an object within the environment, the model based on an object profile corresponding to the object; and a priority of a task the robot is to complete; and security settings, including a security level of the robot.

In Example 34, the subject matter of Example 33 optionally includes: means for retrieving, by the navigation server, the object profile from an object profile database; and means for transmitting, from the navigation server, the object profile to the semi-autonomous mobile robot.

In Example 35, the subject matter of any one or more of Examples 33-34 optionally include, wherein the semi-autonomous mobile robot further comprises: an object detection module to detect an object within the environment; an object classification module to classify a detected object as a member of an object category from a plurality of object categories; and an object specification module to specify a classified object as a particular object within the object category.

In Example 36, the subject matter of Example 35 optionally includes, wherein the object profile corresponds to the object category.

In Example 37, the subject matter of any one or more of Examples 35-36 optionally include, wherein the object profile corresponds to the particular object within the object category.

In Example 38, the subject matter of any one or more of Examples 35-37 optionally include, wherein the plurality of object categories comprises: living creatures; static objects; static-dynamic objects; potentially dynamic objects; and robots.

In Example 39, the subject matter of any one or more of Examples 33-38 optionally include, wherein the semi-autonomous mobile robot is to request a route reservation from the navigation server, the route reservation request comprising: the priority of the task the robot is to complete; a slot of time; and a route within the environment during the slot of time.

In Example 40, the subject matter of Example 39 optionally includes: means for granting, by the navigation server, the route reservation request based at least partially on the priority of the task the robot is to complete.

In Example 41, the subject matter of any one or more of Examples 33-40 optionally include, wherein the security level is an ordinal number.

In Example 42, the subject matter of any one or more of Examples 33-41 optionally include, wherein the map of the environment is redacted based at least partially on the security level of the robot.

In Example 43, the subject matter of any one or more of Examples 33-42 optionally include, wherein the navigation information further comprises: information regarding a plurality of objects within the environment.

In Example 44, the subject matter of any one or more of Examples 33-43 optionally include, wherein the environment is at least one of: a factory; a hospital; an office building; and a prison.

In Example 45, the subject matter of any one or more of Examples 33-44 optionally include, further comprising: means for receiving, by the navigation server, information collected by the semi-autonomous mobile robot; and means for transmitting, from the navigation server, information to the semi-autonomous mobile robot.

In Example 46, the subject matter of any one or more of Examples 33-45 optionally include, wherein the semi-autonomous robot is one of a plurality of semi-autonomous robots operating within the environment.

In Example 47, the subject matter of any one or more of Examples 33-46 optionally include, wherein the interaction information includes a privacy setting specifying information the semi-autonomous mobile robot may share with the object.

Conventional terms in the fields of computer networking and computer systems have been used herein. The terms are known in the art and are provided only as a non-limiting example for convenience purposes. Accordingly, the interpretation of the corresponding terms in the claims, unless stated otherwise, is not limited to any particular definition.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any, adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereon, or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Moreover, in the following claims, the terms "first," "second," and "third," etc. are used merely as labels, and are not intended to impose numerical requirements on their objects.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

The above description is intended to be illustrative, and not restrictive. For example, the above-described examples (or one or more aspects thereof) may be used in combination with each other. Other embodiments may be used, such as by one of ordinary skill in the art upon reviewing the above description.

What is claimed is:

1. A robot comprising:
   a body;
   a motor to move the body in an environment;
   wireless communication circuitry;
   at least one sensor carried by the body, the at least one sensor to output at least one signal corresponding to the environment;
   a storage device carried by the body;
   machine readable instructions; and
   at least one processor carried by the body, the at least one processor to execute the instructions to:
     determine a first travel path on a navigation map corresponding to the robot based on the at least one signal and an area the robot is forbidden to enter, the at least one processor to determine the first travel path to avoid the area,
     determine a designated evacuation position,
     revise the navigation map to change the first travel path to a second travel path leading to the designated evacuation position in response to the robot receiving a notification of an emergency, the second travel path entering the area the robot is forbidden to enter, and
     delete first information obtained while in the area the robot is forbidden to enter from the storage device, wherein second information obtained in an area the robot is allowed to enter is retained.

2. The robot as defined in claim 1, wherein the at least one processor is to determine the first travel path of the robot to avoid an area having traffic.

3. The robot as defined in claim 1, wherein the at least one processor is to classify an object in a first object classification or in a second object classification, and wherein the first object classification corresponds to humans and the second object classification corresponds to non-human objects and wherein the first travel path is determined at least partially based on classifying the object.

4. The robot as defined in claim 3, wherein the second object classification corresponds to robots.

5. The robot as defined in claim 1, wherein the at least one processor is to set an emergency level of the robot in response to the notification of the emergency.

6. The robot as defined in claim 1, wherein the second travel path enters the area the robot is forbidden to enter.

7. The robot as defined in claim 1, wherein the evacuation position corresponds to an outside of a building.

8. The robot as defined in claim 1, wherein the evacuation position corresponds to a room that is separate from the first travel path.

9. The robot as defined in claim 1, wherein the first travel path determined by the at least one processor includes a first lane assigned to robots, the first lane separate from a second lane assigned to humans.

10. The robot as defined in claim 1, wherein the at least one processor is to elevate, in response to receiving the notification of the emergency, a security level of the robot from a first level preventing the robot from accessing the area to a second level permitting the robot to access the area.

11. The robot as defined in claim 10, wherein the at least one processor is to delete information obtained while in the area from the storage device, after the security level is reset to the first level.

12. The robot as defined in claim 11, wherein the at least one processor is to delete the information in response to the security level being reset to the first level.

13. A non-transitory computer readable medium comprising instructions which, when executed, cause at least one processor of a robot to:
determine a first travel path on a navigation map corresponding to the robot based on sensor output corresponding to an environment and an area the robot is forbidden to enter, the first travel path to avoid the area;
determine a designated evacuation position;
revise the navigation map to change the first travel path to a second travel path leading to the designated evacuation position in response to the robot receiving a notification of an emergency, the second travel path entering the area the robot is forbidden to enter; and
delete first information obtained while in the area the robot is forbidden to enter from the storage device, wherein second information obtained in an area the robot is allowed to enter is retained.

14. The non-transitory computer readable medium as defined in claim 13, wherein the area is a first area, and wherein the instructions cause the at least one processor to determine the first travel path of the robot to avoid a second area having traffic corresponding to humans.

15. The non-transitory computer readable medium as defined in claim 13, wherein the instructions further cause the at least one processor to classify an object in a first object classification or in a second object classification, and wherein the first object classification corresponds to humans and the second object classification corresponds to non-human objects.

16. The non-transitory computer readable medium as defined in claim 15, wherein the second object classification corresponds to robots.

17. The non-transitory computer readable medium as defined in claim 13, wherein the instructions cause the at least one processor to set to an emergency level of the robot in response to the notification of the emergency.

18. The non-transitory computer readable medium as defined in claim 13, wherein the determined first travel path includes a first lane assigned to robots, the first lane separate from a second lane assigned to humans.

19. An apparatus comprising:
means for outputting at least one signal corresponding to an environment; and
means for processing to:
determine a first travel path on a navigation map corresponding to a robot based on the at least one signal, and an area the robot is forbidden to enter, the first travel path to be determined to avoid the area,
determine a designated evacuation position;
revise the navigation map to change the first travel path to a second travel path leading to the designated evacuation position in response to the robot receiving a notification of an emergency, the second travel path entering the area the robot is forbidden to enter, and
delete first information obtained while in the area the robot is forbidden to enter from the storage device, wherein second information obtained in an area the robot is allowed to enter is retained.

20. The apparatus as defined in claim 19, wherein the means for processing is to determine assignments of first and second lanes of the first travel path.

21. The apparatus as defined in claim 19, further including means for classifying to determine whether an object is a human or a non-human object.

22. The apparatus as defined in claim 19, wherein the means for processing is to determine the first travel path to avoid an area having traffic.

23. The apparatus as defined in claim 19, wherein the travel path determined by the means for processing includes a first lane assigned to robots, the first lane separate from a second lane assigned to humans.

24. A robot comprising:
a body;
a motor to move the body in an environment;
wireless communication circuitry;
at least one sensor carried by the body, the at least one sensor to output at least one signal corresponding to the environment;
a storage device carried by the body;
machine readable instructions; and
at least one processor carried by the body, the at least one processor to execute the instructions to:
determine a first travel path on a navigation map corresponding to the robot based on the at least one signal and an area the robot is forbidden to enter, the at least one processor to determine the first travel path to avoid the area,
revise the navigation map to change the first travel path to a second travel path leading to a designated evacuation position in response to the robot receiving a notification of an emergency, wherein the at least one processor is to elevate, in response to receiving the notification of the emergency, a security level of the robot from a first level preventing the robot from accessing the area to a second level permitting the robot to access the area, the second travel path entering the area the robot is forbidden to enter, and
delete first information obtained while in the area the robot is forbidden to enter from the storage device, wherein second information obtained in an area the robot is allowed to enter is retained.

* * * * *